(12) United States Patent
Halasinski et al.

(10) Patent No.: US 11,759,051 B2
(45) Date of Patent: Sep. 19, 2023

(54) SMOKING AND BASTING LID (71) Applicant: HALL OF FAME INNOVATIONS LLC, Canton, OH (US)

(72) Inventors: Brian Halasinski, Canton, OH (US); Kirk W. Hyust, Canton, OH (US)

(73) Assignee: TURBO TRUSSER LLC, Canton, OH (US)

(*) Notice: Subject to any disclaimer, the term of this patent is extended or adjusted under 35 U.S.C. 154(b) by 600 days.

(21) Appl. No.: 16/862,003

(22) Filed: Apr. 29, 2020

(65) Prior Publication Data
US 2021/0137128 A1 May 13, 2021

Related U.S. Application Data (60) Provisional application No. 62/933,556, filed on Nov. 11, 2019.

(51) Int. Cl.
A23B 4/052 (2006.01)
A47J 36/06 (2006.01)
A47J 37/07 (2006.01)

(52) U.S. Cl.
CPC .......... *A47J 37/0786* (2013.01); *A23B 4/052* (2013.01); *A47J 36/06* (2013.01)

(58) Field of Classification Search
None
See application file for complete search history.

(56) References Cited

U.S. PATENT DOCUMENTS

| 2,205,914 | A | * | 6/1940 | Stafford | A47J 37/043 |
| | | | | | 99/421 P |
| 3,333,526 | A | | 8/1967 | Kirkpatrick | |
| 4,175,485 | A | | 11/1979 | Wojahn | |
| 4,374,489 | A | | 2/1983 | Robbins | |
| 4,770,157 | A | | 9/1988 | Shepherd et al. | |
| 5,197,455 | A | | 3/1993 | Tessien | |
| 5,469,835 | A | | 11/1995 | Stephen et al. | |
| 5,588,355 | A | | 12/1996 | Mead et al. | |
| 5,588,420 | A | * | 12/1996 | Dickson | A47J 37/0704 |
| | | | | | 126/25 R |
| 6,019,035 | A | * | 2/2000 | Jonas | A23B 4/052 |
| | | | | | 126/25 R |
| 6,293,271 | B1 | * | 9/2001 | Barbour | A47J 37/0704 |
| | | | | | 126/41 R |
| 6,708,604 | B1 | * | 3/2004 | Deichler, Jr. | A47J 37/0763 |
| | | | | | 99/449 |
| 7,694,626 | B2 | * | 4/2010 | Davis | A47J 37/0786 |
| | | | | | 99/482 |
| 8,651,018 | B1 | | 2/2014 | Loud, III | |
| 10,021,889 | B2 | | 7/2018 | Vinett | |
| 2006/0266344 | A1 | * | 11/2006 | Chung | A47J 37/0786 |
| | | | | | 126/25 R |

FOREIGN PATENT DOCUMENTS

WO WO-2017033388 A1 * 3/2017 ............. A23B 4/052

* cited by examiner

*Primary Examiner* — John J Norton
(74) *Attorney, Agent, or Firm* — Hudak, Shunk & Farine Co. LPA (57) ABSTRACT A smoking and basting lid including its own smoking unit that holds a smoke producing substance in a capsule of the lid which allows the lid to smoke a food covered by the lid.

18 Claims, 8 Drawing Sheets

SMOKING AND BASTING LID

CROSS-REFERENCE TO RELATED APPLICATIONS

This application claims priority under 35 USC § 119(e)(1) and § 120 to U.S. Provisional Patent Application Ser. No. 62/933,556 filed Nov. 11, 2019, herein fully incorporated by reference.

FIELD OF THE INVENTION

The present invention relates to a smoking and basting lid including its own smoking unit that holds a smoke producing substance in a capsule of the lid which allows the lid to smoke a food covered by the lid.

BACKGROUND OF THE INVENTION

Various devices for basting foods are known in the art and include basting lids which are placed over and cover a food on a cooking surface such as a flat top griddle. The basting lid contains the moisture produced by the food in order to prevent the food from drying out during cooking.

Other devices are known in the art for smoking foods wherein a smoke flavor is imparted to the food being prepared. Devices that smoke foods are often enclosed cooking units such as free-standing food smokers and electric indoor smokers. Such devices typically provide dry heat to a food and surround the food with smoke from a smoke source that is circulated through the device, with the smoke source often being charcoal or wood. In smoking devices, the heat source is not in direct contact with the food being prepared.

In view of the above, the art still needs a solution for basting foods and keeping them moist, while also being able to impart a smoke flavor to the food simultaneously, especially while the food is being cooked in direct contact with a heating surface, such as a grill or griddle.

SUMMARY OF THE INVENTION

In view of the above, the present invention solves the problems of the prior art and others by providing a device, in particular a lid or cover that can be used on a cooking surface such as a flat top griddle that bastes and smokes a food at the same time, which would otherwise not be possible because cooking surfaces such as flat top griddles do not produce natural smoke. The device easily adds smoke flavor to foods that would otherwise not be possible without additional processing. Also, the device is easy to use and provides the user with an adjustable vent that can be used to regulate the amount of smoke flavor introduced to the food. The disclosed device advantageously addresses the aforementioned deficiencies by providing an easy to use device and method to smoke and baste foods at the same time.

In order to accomplish the above noted goals and others, the smoking and basting lid of the invention includes a main body having an interior volume. The main body is not limited to any particular shape, but is generally square, rectangular or round in preferred embodiments and includes a handle that is used to manipulate the device and place the same over the food resting on the cooking surface, such that the food is located within the interior volume of the lid.

In an important aspect of the invention, the lid includes a capsule for holding a smoke producing substance operatively connected to the main body of the lid and having a chamber extending from the inner surface of the main body into the interior volume of the main body. The capsule holds a material that generates smoke that can circulate within at least a portion of the interior volume of the lid. The main body of the lid includes an aperture between the inner surface and outer surface of the main body that allows access to the capsule from outside of the lid which allows smoke producing material to be added to the capsule and also allows the material to be lit on fire. A capsule cover or lid is provided to close the capsule aperture.

In additional embodiments the device may include one or more of an adjustable vent and air or breather apertures.

One method of utilizing the smoking and basting lid includes providing a material that generates smoke to the capsule, lighting the smoke generating material and producing smoke and placing the lid over the food, either before or after lighting the smoke generating material, wherein the lid captures the smoke and also bastes or steams the food and smokes the food simultaneously.

The disclosed device is unique when compared with other known devices and solutions because it provides: (1) a means to baste foods on a cooking surface that does not generate its own smoke such as a flat top griddle; (2) a means to add real smoke flavor to foods on the cooking surface; (3) a means to baste and smoke foods simultaneously on the cooking surface; and (4) a means to control the amount of smoke/steam being introduced to the food being prepared on the cooking surface.

The disclosed device is superior to known basting lids because it provides a capsule for holding a smoke producing substance such as smoke pellets or wood chips that can quickly and easily add real smoke flavor to foods being prepared on a cooking surface such as a flat top griddle, and includes an adjustable vent that works in conjunction with air or breather apertures to control air flow, smoke and steam in order to properly season and cook food.

In one aspect of the invention, a smoking and basting lid is disclosed, comprising a main body having a lower edge adapted to contact a cooking surface, the main body having an inner surface, and an outer surface, and an interior volume, a handle connected to the outer surface of the main body, a vent having a vent aperture extending between the inner surface and outer surface of the main body, the vent being adjustable to change the size of the vent aperture, and a capsule for holding a smoke producing substance, operatively connected to the main body and having a chamber extending outwardly from the inner surface of the main body into the interior volume of the main body, the capsule having an interior volume for holding a material that generates smoke, wherein the chamber includes at least one aperture that allows the smoke to travel from inside the chamber to at least a portion of the interior volume of the main body.

In a further aspect, the main body has a capsule aperture extending between the outer surface and the inner surface that provides access to the interior volume of the capsule, wherein the lid further includes a capsule cover operatively connectable to the man body that seals the capsule aperture In yet another aspect, the capsule chamber has a solid bottom and a sidewall that includes the at least one aperture.

In still a further aspect, the capsule is connected to the main body at a location offset from a center of the main body, and wherein the vent is offset from the center of the main body on an opposite side of the main body.

In a further aspect, the main body includes at least one breather aperture extending between the inner surface and the outer surface, located further away from a center of the main body than the capsule.

In yet another aspect, the capsule is located between the center and the at least one breather aperture.

In still a further aspect, the vent includes a wheel connected to the outer surface of the main body at a pivot point, wherein the wheel can be rotated to adjust the size of the vent aperture.

In a further aspect, the wheel includes a wheel aperture alignable with the vent aperture to permit air to flow from the interior volume of the main body to outside the lid.

In yet another aspect, wherein the handle is located between the vent and the capsule cover.

In still a further aspect, the wheel includes a plurality of apertures and the vent includes a plurality of apertures.

In a further aspect of the invention, a smoking and basting lid is disclosed, comprising a main body having lower edge adapted to contact a cooking surface, the main body having an inner surface, and an outer surface, and an interior volume, a handle connected to the outer surface of the main body, and a capsule for holding a smoke producing substance, operatively connected to the main body and having a chamber extending outwardly from the inner surface of the main body into the interior volume of the main body, the capsule having an interior volume for holding a material that generates smoke, wherein the chamber includes at least one aperture that allows the smoke to travel from inside the chamber to at least a portion of the interior volume of the main body.

BRIEF DESCRIPTION OF THE DRAWINGS

The invention will be better understood, and other features and advantages will become apparent by reading the detailed description of the invention, taken together with the drawings, wherein.

DETAILED DESCRIPTION OF THE INVENTION

This description of preferred embodiments is to be read in connection with the accompanying drawings, which are part of the entire written description of this invention. In the description, corresponding reference numbers are used throughout to identify the same or functionally similar elements. Relative terms such as "horizontal," "vertical," "up," "upper", "down," "lower", "top" and "bottom" as well as derivatives thereof (e.g., "horizontally," "downwardly," "upwardly," etc.) should be construed to refer to the orientation as then described or as shown in the drawing figure under discussion. These relative terms are for convenience of description and are not intended to require a particular orientation unless specifically stated as such. Terms including "inwardly" versus "outwardly," "longitudinal" versus "lateral" and the like are to be interpreted relative to one another or relative to an axis of elongation, or an axis or center of rotation, as appropriate. Terms concerning attachments, coupling and the like, such as "connected" and "interconnected," refer to a relationship wherein structures are secured or attached to one another either directly or indirectly through intervening structures, as well as both movable or rigid attachments or relationships, unless expressly described otherwise. The term "operatively connected" is such an attachment, coupling or connection that allows the pertinent structures to operate as intended by virtue of that relationship.

Turning now to the drawings wherein like reference numbers refer to the same or like parts throughout the description, a smoking and basting lid 1 is illustrated in FIGS. 1-8. The lid 1 generally includes a main body 10, a handle 2, a capsule 5 for holding a smoke producing substance, an adjustable vent 4 and a capsule cover of lid 9 and one or more air or breather aperture 11.

The main body 10 of lid 1 is not limited to any particular form and is desirably constructed having a sufficient interior volume to cover a food and also provide air space for smoke and/or moisture to circulate within the lid during cooking of the food. The main body can be formed of generally any shape, with a rectangular main body being shown in FIGS. 1 through 7 and a round configuration shown in FIG. 8. The main body generally has an upper surface and side surfaces extending generally downwardly therefrom that terminate at a lower edge 12 adapted to contact the cooking surface. In a preferred embodiment, the lower edge 12 is planar. When the main body is square or rectangular for example as shown in FIGS. 1-7, the top transitions into preferably four sides, with opposite sides being substantially parallel to each other. The sides extend downwardly to common bottom edge 12. The main body 10 can be formed of generally any durable material and is preferably metal, with stainless steel most preferred in some embodiments.

One or more handles 2 are connected to the outer surface of the main body 10 of lid 1 for manipulating the lid, as the main body can become too hot to touch when situated on a cooking surface. The handle can have generally any desired shape as long as the primary functions of the handle, namely the ability to manipulate the lid 1 and being heat resistant so that the handle can be used and gripped while the lid is on the cooking surface, are maintained. The handle 2 as shown in the figures is connected to the main body at two different locations, but it is to be understood that other handles may only have one connection point, or may have more than two connection points to main body 10. The handle can be formed of any suitable, durable, and heat resistant material. Various polymers and wood are suitable materials.

When one handle is utilized, it is preferably centrally located on the outer surface of the lid. Having a centrally located handle makes the lid easy to control and provides a balanced feel for the user, Lid 1 also includes a capsule 5 generally in the form of a container that holds a smoke producing substance that is used to impart a smoke flavor to a food. The smoke producing substance can be generally any material that can impart a flavor to a food. Preferred smoke producing materials comprise components that can be burned and include, but are not limited to, components derived from wood such as wood chips, wood pellets, and wood shavings; spices, and the like.

Capsule 5 is operatively connected to main body 10 and includes a chamber extending outwardly from the inner surface of the main body into the interior volume of the main body. Capsule 5 has an interior volume for holding the material that generates smoke. Chamber 5 includes at least one aperture that allows the smoke to travel from inside the chamber to at least a portion of the interior volume of the main body. The at least one chamber aperture can have any suitable form. The at least one chamber aperture can be for example an air-permeable screen, a grid including multiple apertures or a series of perforations in one or more surfaces of the capsule, for example as illustrated in the figures, see especially FIGS. 3 and 4 which include bottom views of the smoking and basting lid 1. In a preferred embodiment, the capsule 5 chamber has a solid bottom, such as illustrated in the figures and a sidewall that includes the at least one aperture.

The main body has a capsule aperture extending between the outer surface and the inner surface that provides access to the interior volume of the capsule 5. Lid 1 further includes a capsule cover 9 operatively connectable to the main body that seals the capsule aperture and ensures smoke from the smoke producing substance circulates into the interior volume of the main body and not through the capsule aperture.

During use, the smoke producing material can be inserted into the interior volume of the capsule within the chamber and the material activated, such as by lighting the material. Thereafter, the capsule cover 9 can be connected to the main body thereby closing the capsule aperture. Smoke from the smoke producing substance then circulates through the interior volume of the main body when it exits the chamber.

Figure 1:
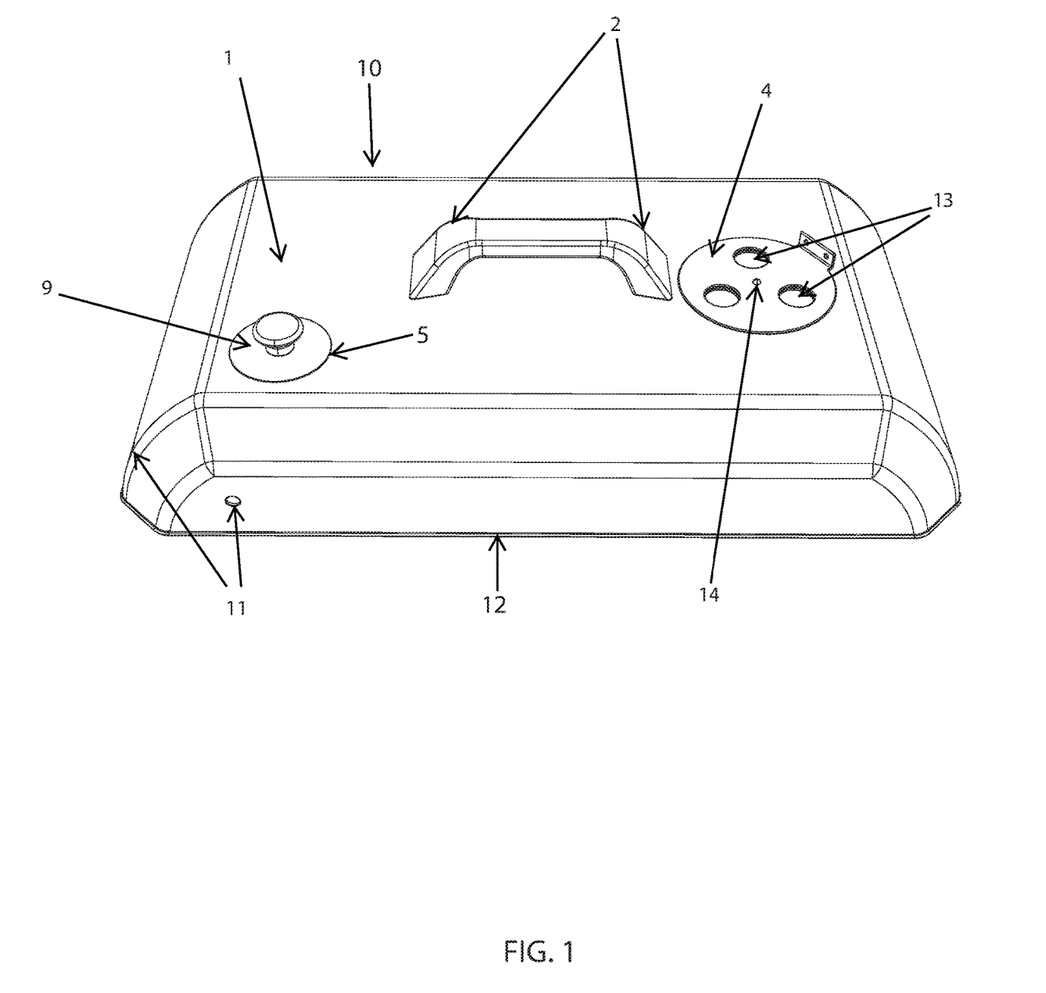
FIG. 1 is a top front perspective view of one embodiment of a smoking and basting lid according to the present invention.
Figure 2:
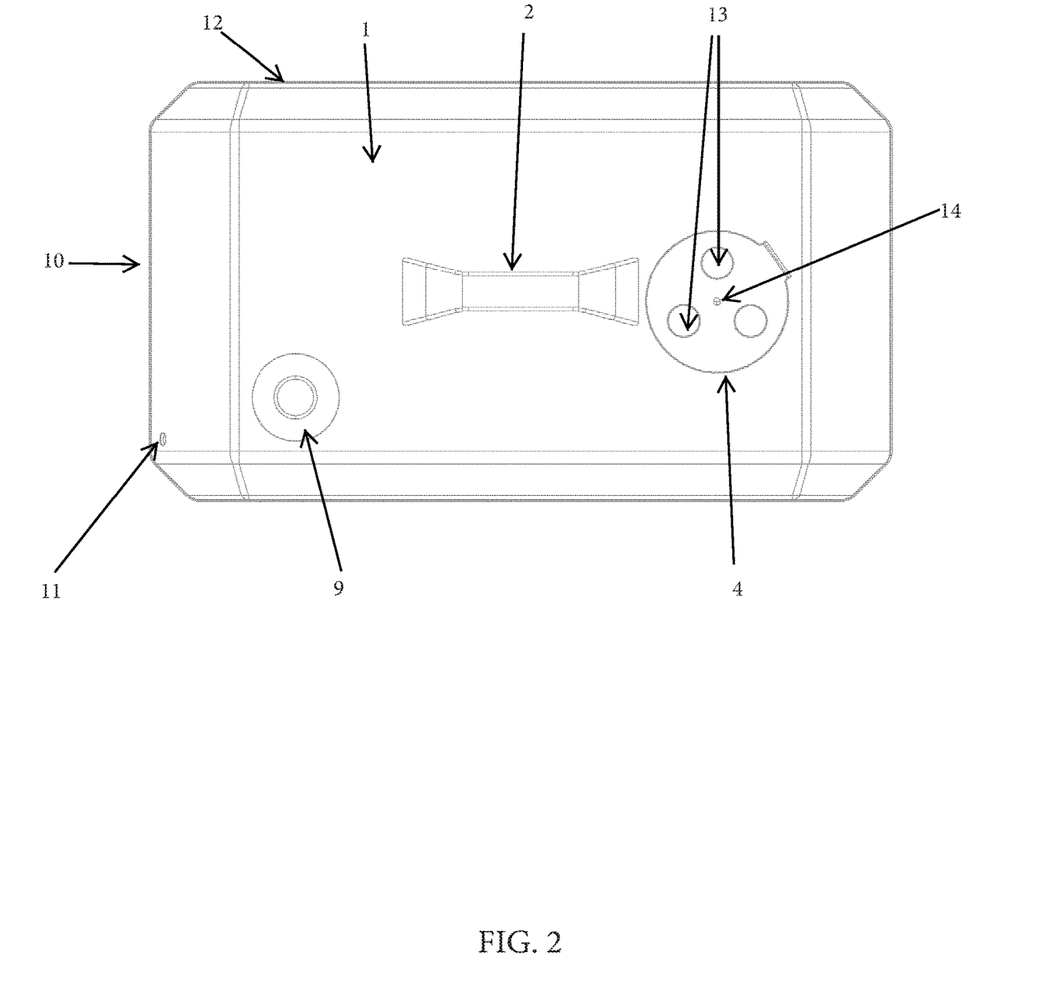
FIG. 2 is a top view thereof.
Figure 3:
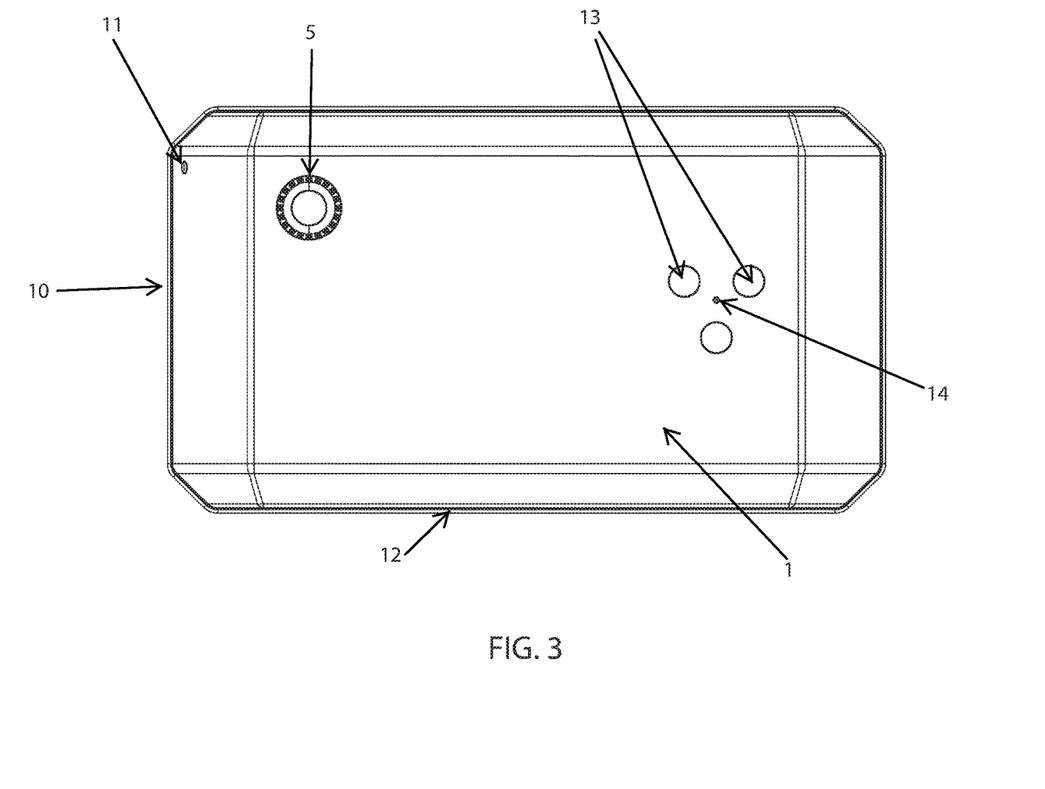
FIG. 3 is a bottom view thereof.
Figure 4:
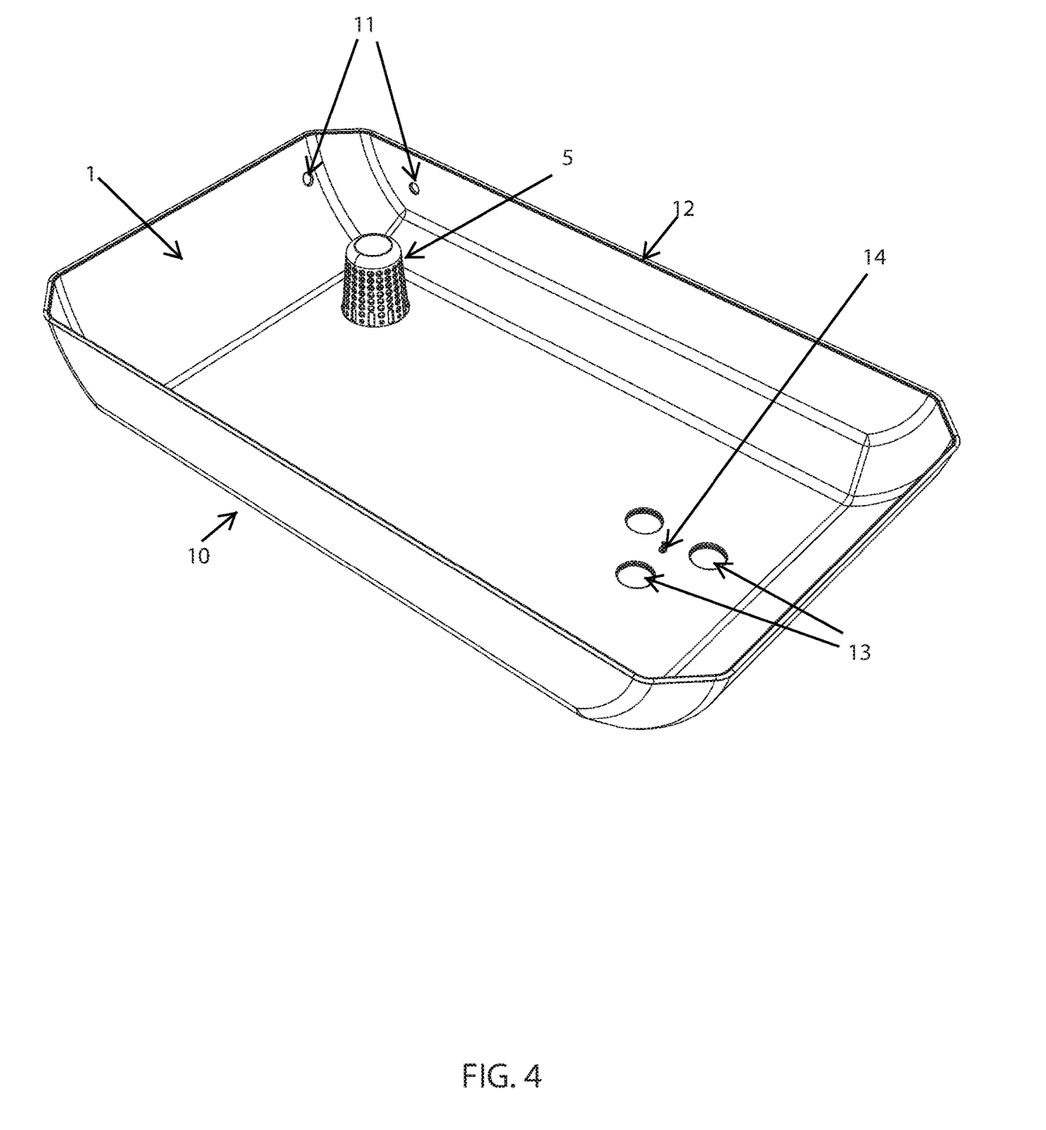
FIG. 4 is a bottom perspective view thereof.
Figure 5:
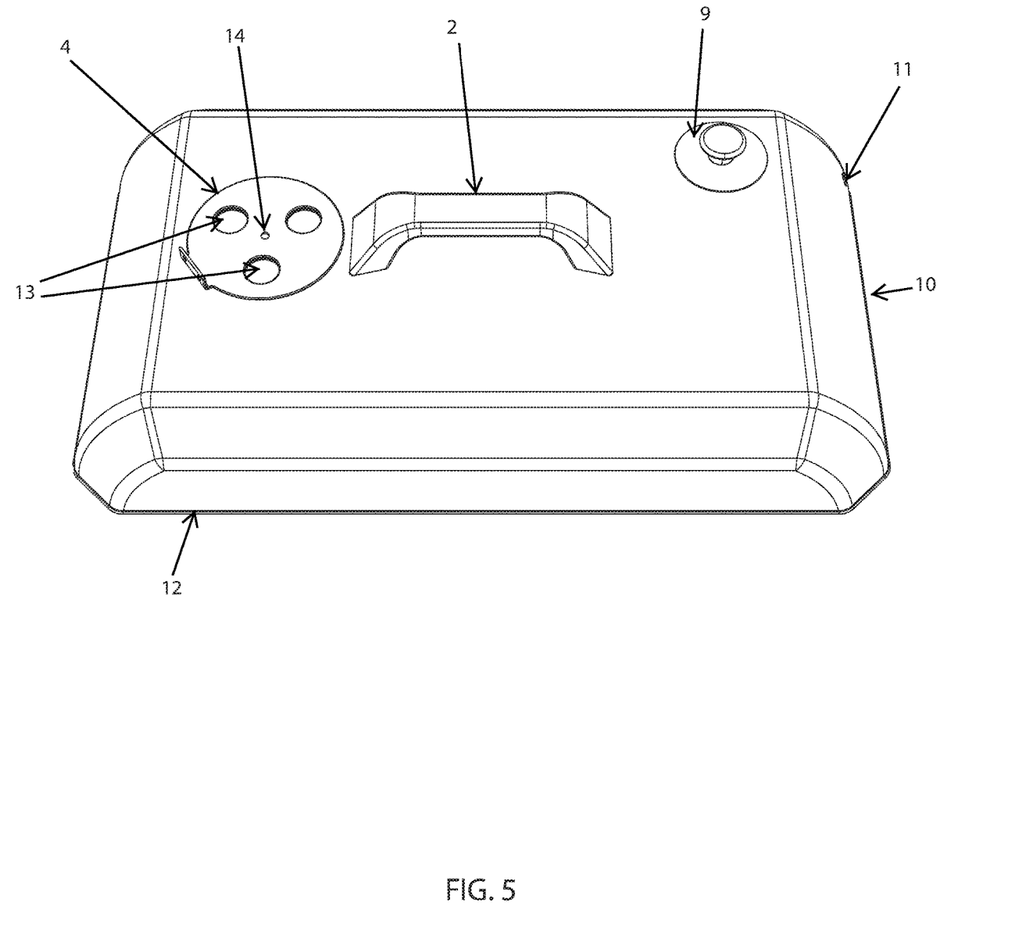
FIG. 5 is a top rear perspective view thereof.
Figure 6:
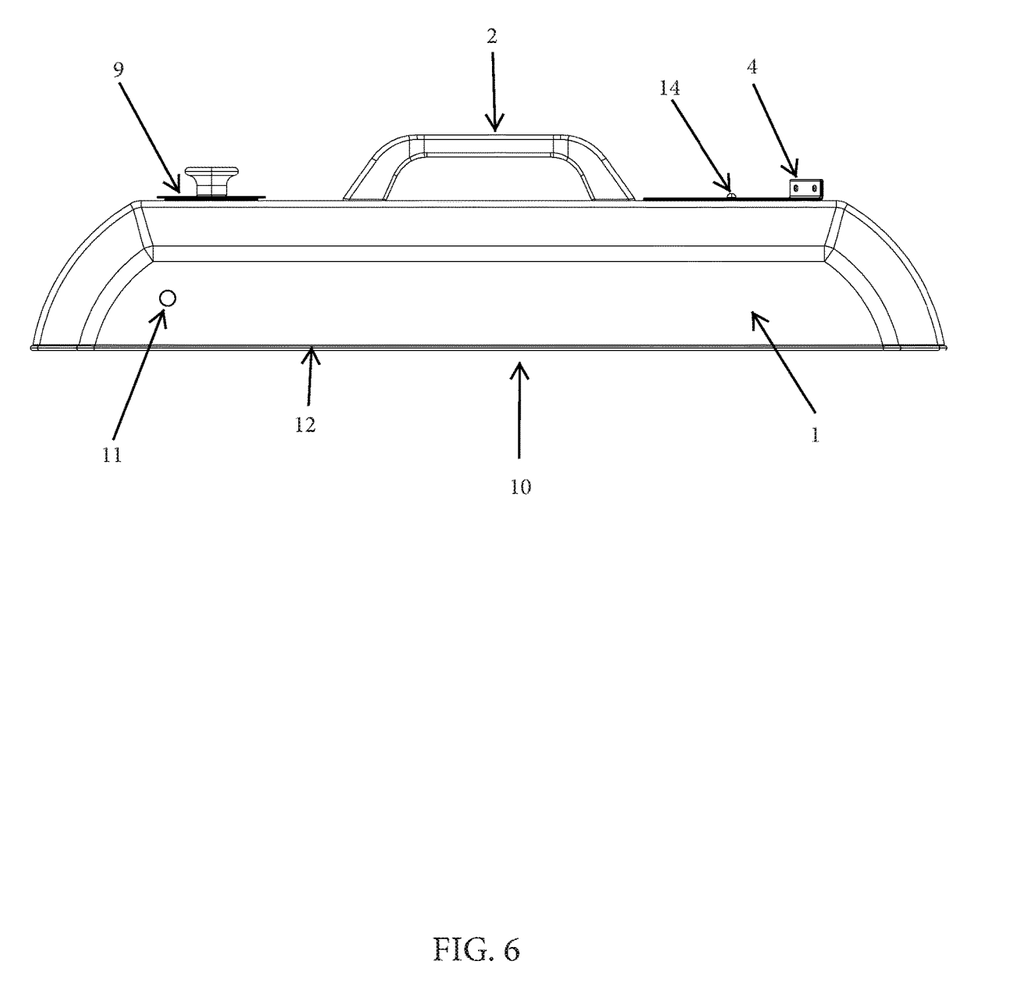
FIG. 6 is a front side view thereof.
Figure 7:
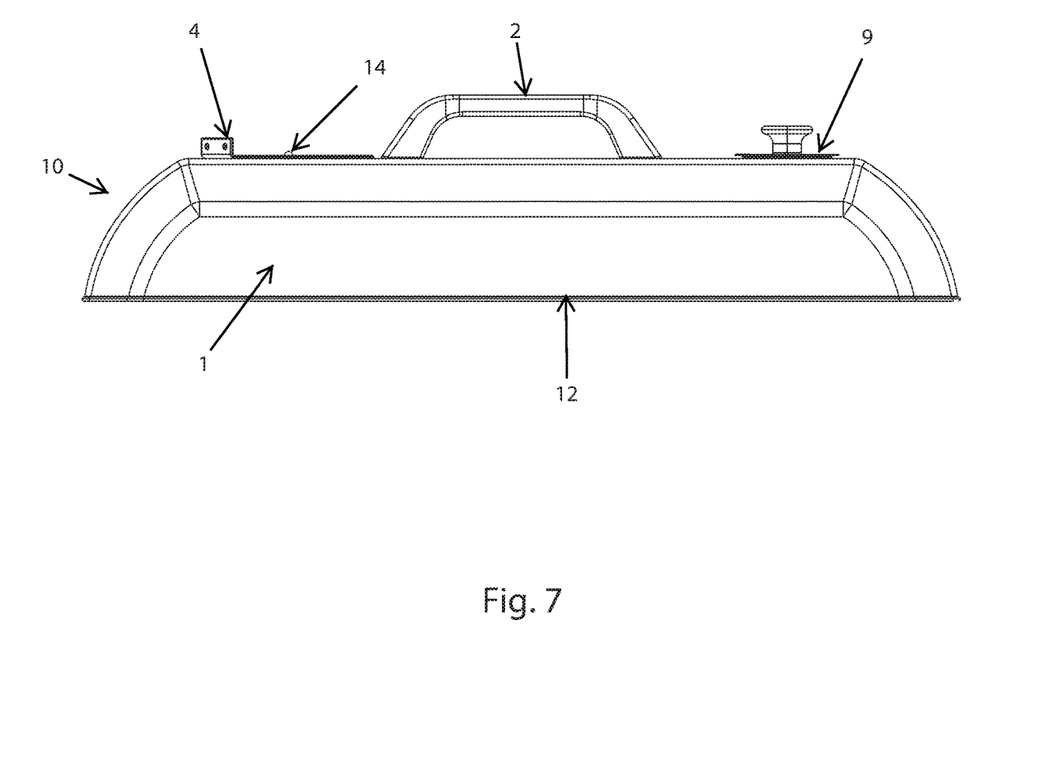
FIG. 7 is a rear side view thereof.
Figure 8:
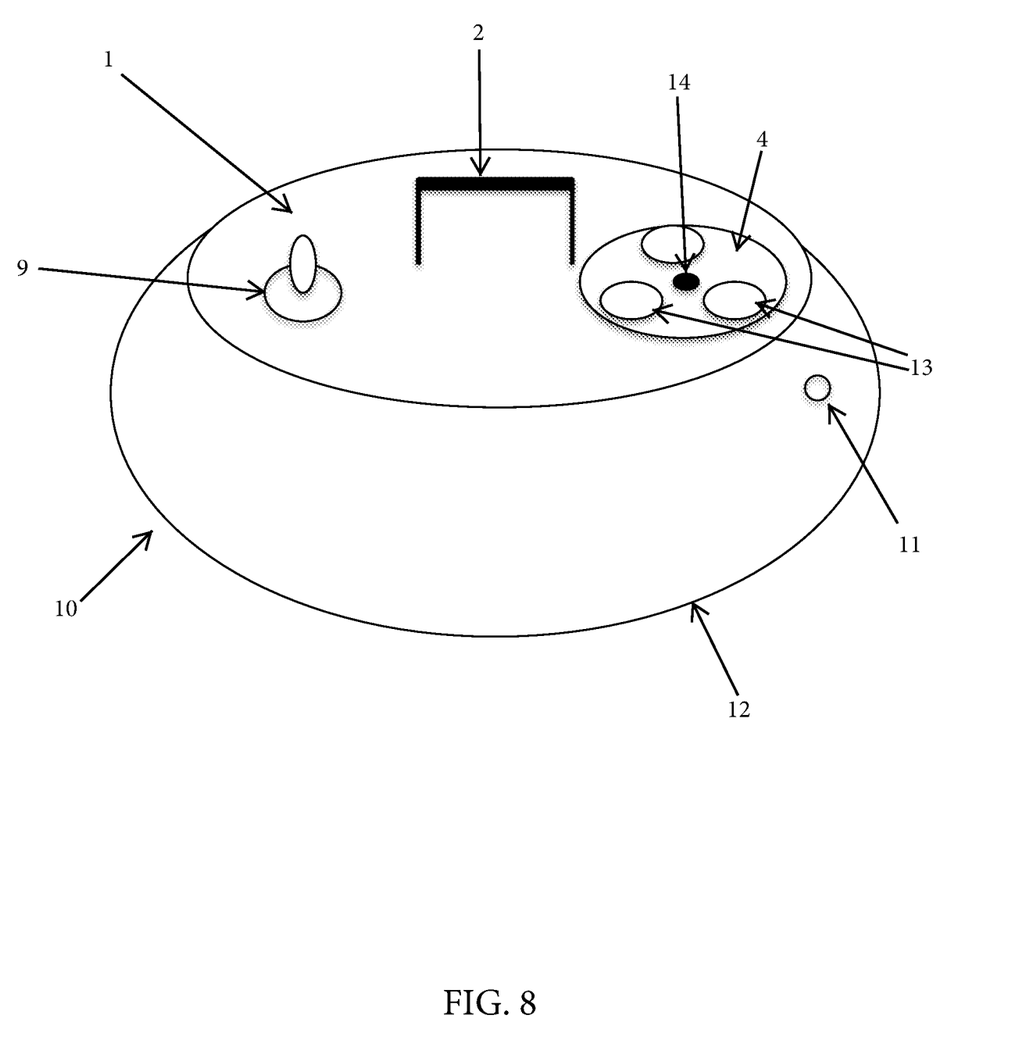
FIG. 8 is a top perspective view of further embodiment of a smoking and basting lid having a round main body configuration.

Lid 1 also includes a vent for having at least one aperture extending between the inner surface and the outer surface of the main body. The vent 4 is adjustable to change the size of the vent aperture. Three vent apertures 13 are illustrated in FIGS. 3 and 4, but it is to be understood that more or less apertures can be present.

In a preferred embodiment, the vent 4 includes a rotatable vent wheel connected to the outer surface of the main body at a pivot point 14. The vent wheel can be rotated as desired to adjust the size of the vent aperture. For clarity, it is to be understood that the size of the vent aperture can be adjusted so that the vent aperture can be completely closed or completely opened, or have any size therebetween. The changing the size of the vent aperture is generally accomplished by utilizing a wheel that includes a wheel aperture alignable with the vent aperture to permit air to flow from the interior volume of the main body to outside the lid.

In an additionally embodiment of the invention, the main body 10 includes at least one breather aperture 11 extending between the inner surface and the outer surface. In a preferred embodiment, the breather aperture 11 is located further away from the center of the main body 10 then the capsule. In a further preferred embodiment, the capsule is located somewhere between the center of the main body and the at least one breather aperture. This allows air to enter the breather aperture and travel through and/or past the chamber of the capsule and circulate within the interior volume prior to being expelled through vent 4.

For the avoidance of doubt, it is noted that the invention relates to all possible combinations of features described herein, preferred in particular are those combinations of features that are present in the claims. It will therefore be appreciated that all combinations of features relating to the device according to the invention and; all combinations of features relating to the process according to the invention are described herein.

It is further noted that the term 'comprising' does not exclude the presence of other elements. However, it is also to be understood that a description of a device comprising certain components also discloses a device consisting of these components. Similarly, it is also to be understood that a description on a process comprising certain steps also discloses a process consisting of these steps. The device consisting of these components may be advantageous in that it offers a simpler, more economical process for the preparation of the device. Similarly, it is also to be understood that a description on a process comprising certain steps also discloses a process consisting of these steps. The process consisting of these steps may be advantageous in that it offers a simpler, more economical process.

In accordance with the patent statutes, the best mode and preferred embodiment have been set forth; the scope of the invention is not limited thereto, but rather by the scope of the attached claims.

What is claimed is:

1. A smoking and basting lid, comprising:
   a main body having a lower edge adapted to contact a cooking surface, the main body having an inner surface, and an outer surface, and an interior volume;
   a handle connected to the outer surface of the main body;
   a vent having a vent aperture extending between the inner surface and outer surface of the main body, the vent being adjustable to change the size of the vent aperture; and
   a capsule operatively connected to the main body and having a chamber extending outwardly from the inner surface of the main body into the interior volume of the main body, the capsule having an interior volume for holding a material that generates smoke, wherein the chamber includes at least one aperture that allows the smoke to travel from inside the chamber to at least a portion of the interior volume of the main body,
   wherein the main body includes at least one breather aperture extending between the inner surface and the outer surface, located further away from a center of the main body than the capsule, and
   wherein the capsule is located between the center and the at least one breather aperture.

2. The lid according to claim 1, wherein the capsule chamber has a solid bottom and a sidewall that includes the at least one aperture.

3. The lid according to claim 1, wherein the capsule is connected to the main body at a location offset from the center of the main body, and wherein the vent is offset from the center of the main body on an opposite side of the main body.

4. The lid according to claim 1, wherein the vent includes a wheel connected to the outer surface of the main body at a pivot point, wherein the wheel can be rotated to adjust the size of the vent aperture.

5. The lid according to claim 4, wherein the wheel includes a wheel aperture alignable with the vent aperture to permit air to flow from the interior volume of the main body to outside the lid.

6. The lid according to claim 5, wherein the wheel includes a plurality of apertures and the vent includes a plurality of apertures.

7. A smoking and basting lid, comprising:
   a main body having a lower edge adapted to contact a cooking surface, the main body having an inner surface, an outer surface, an upper surface, side surfaces extending downwardly from the upper surface, and an interior volume wherein the side surfaces terminate at the lower edge;
   a handle connected to the outer surface of the main body;
   a vent having a vent aperture located on the upper surface and extending between the inner surface and outer surface of the main body, the vent being adjustable to change the size of the vent aperture; and a capsule operatively connected to the main body and having a chamber extending outwardly from the inner surface of the main body into the interior volume of the main body, the capsule having an interior volume for holding a material that generates smoke, wherein the chamber includes at least one aperture that allows the smoke to travel from inside the chamber to at least a portion of the interior volume of the main body wherein the main body has a capsule aperture extending between the outer surface and the inner surface that provides access to the interior volume of the capsule, wherein the lid further includes a capsule cover operatively connectable to the main body that seals the capsule aperture, and wherein the main body includes at least one breather aperture between the inner surface and the outer surface located in the side surface to allow air to enter the breather aperture and be expelled through the vent.

8. The lid according to claim 7, wherein the at least one breather aperture is located further away from a center of the main body than the capsule.

9. The lid according to claim 8, wherein the capsule is located between the center and the at least one breather aperture.

10. The lid according to claim 7, wherein the handle is located between the vent and the capsule cover.

11. A smoking and basting lid, comprising:
a main body having a lower edge adapted to contact a cooking surface, the main body having an inner surface, and an outer surface, and an interior volume;
a handle connected to the outer surface of the main body; and
a capsule operatively connected to the main body and having a chamber extending outwardly from the inner surface of the main body into the interior volume of the main body, the capsule having an interior volume for holding a material that generates smoke, wherein the chamber includes at least one aperture that allows the smoke to travel from inside the chamber to at least a portion of the interior volume of the main body, wherein the main body includes at least one breather aperture extending between the inner surface and the outer surface, located further away from a center of the main body than the capsule, and wherein the capsule is located between the center and the at least one breather aperture.

12. The lid according to claim 11, wherein the main body has a capsule aperture extending between the outer surface and the inner surface that provides access to the interior volume of the capsule, wherein the lid further includes a capsule cover operatively connectable to the main body that seals the capsule aperture.

13. The lid according to claim 12, wherein the capsule chamber has a solid bottom and a sidewall that includes the at least one aperture.

14. The lid according to claim 13, further including a vent having an aperture extending between the inner surface and outer surface of the main body, the vent being adjustable to change the size of the aperture.

15. The lid according to claim 14, wherein the capsule is connected to the main body at a location offset from the center of the main body, and wherein the vent is offset from the center of the main body n an opposite side of the main body.

16. The lid according to claim 14, wherein the vent includes a wheel connected to the outer surface of the main body at a pivot point, wherein the wheel can be rotated to adjust the size of the vent aperture.

17. The lid according to claim 16, wherein the wheel includes a wheel aperture alignable with the vent aperture to permit air to flow from the interior volume of the main body to outside the lid.

18. The lid according to claim 17, wherein the wheel includes a plurality of apertures and the vent includes a plurality of apertures.

* * * * *